United States Patent
Shimada et al.

(10) Patent No.: US 10,801,299 B2
(45) Date of Patent: Oct. 13, 2020

(54) PACKER

(71) Applicants: TEISEKI DRILLING CO., LTD., Shinjuku-ku, Tokyo (JP); THE UNIVERSITY OF TOKYO, Bunkyo-ku, Tokyo (JP)

(72) Inventors: Kuniaki Shimada, Tokyo (JP); Shigemi Naganawa, Tokyo (JP); Seiki Horimoto, Gifu (JP)

(73) Assignees: TEISEKI DRILLING CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 148 days.

(21) Appl. No.: 16/062,251

(22) PCT Filed: Dec. 9, 2016

(86) PCT No.: PCT/JP2016/086702
§ 371 (c)(1),
(2) Date: Jun. 14, 2018

(87) PCT Pub. No.: WO2017/104563
PCT Pub. Date: Jun. 22, 2017

(65) Prior Publication Data
US 2018/0371866 A1    Dec. 27, 2018

(30) Foreign Application Priority Data
Dec. 15, 2015   (JP) .................. 2015-243868

(51) Int. Cl.
*E21B 33/12* (2006.01)
*E21B 34/06* (2006.01)
(Continued)

(52) U.S. Cl.
CPC ........ *E21B 33/1208* (2013.01); *E21B 34/063* (2013.01); *E21B 36/001* (2013.01);
(Continued)

(58) Field of Classification Search
CPC ............... E21B 33/1208; E21B 34/063; E21B 41/0085; E21B 43/103; E21B 33/12; E21B 36/001; F24T 2010/50
See application file for complete search history.

(56) References Cited

U.S. PATENT DOCUMENTS 6,446,717 B1 * 9/2002 White ................. E21B 33/1212
166/187
6,640,893 B1 * 11/2003 Rummel ............. E21B 33/1208
166/187

(Continued)

FOREIGN PATENT DOCUMENTS

JP      S6462592 A      3/1989
JP      H07293726 A     11/1995

(Continued)

OTHER PUBLICATIONS

International Search Report (ISR) dated Mar. 14, 2017 issued in International Application No. PCT/JP2016/086702.
(Continued)

*Primary Examiner* — Daniel P Stephenson
(74) *Attorney, Agent, or Firm* — Holtz, Holtz & Volek PC

(57) ABSTRACT

A packer connected to a casing pipe, the packer including a connecting tube made of metal and connected to the casing pipe, and a packer part made of metal and attached around the connecting tube. The packer part has a hollow part inside. A sealed liquid that thermally expands is sealed in the hollow part. An outer peripheral wall of the packer part includes an expansive part that protrudingly deforms outward with the thermal expansion of the sealed liquid.

10 Claims, 4 Drawing Sheets

(51) Int. Cl.
*E21B 41/00* (2006.01)
*E21B 43/10* (2006.01)
*E21B 36/00* (2006.01)
*F24T 10/00* (2018.01)

(52) U.S. Cl.
CPC ........ *E21B 41/0085* (2013.01); *E21B 43/103* (2013.01); *F24T 2010/50* (2018.05)

(56) References Cited

U.S. PATENT DOCUMENTS

| | | | | |
|---|---|---|---|---|
| 6,854,522 | B2* | 2/2005 | Brezinski | E21B 33/12 |
| | | | | 166/387 |
| 7,669,661 | B2* | 3/2010 | Johnson | E21B 23/04 |
| | | | | 166/373 |
| 8,136,605 | B2* | 3/2012 | Nutley | E21B 33/1208 |
| | | | | 166/387 |
| 8,714,273 | B2* | 5/2014 | Lynde | E21B 33/1212 |
| | | | | 166/179 |
| 9,080,415 | B2* | 7/2015 | Hallundbæk | E21B 33/1208 |
| 9,481,156 | B2 | 11/2016 | Igi | |
| 2009/0272545 | A1 | 11/2009 | Bour | |
| 2010/0139930 | A1* | 6/2010 | Patel | E21B 33/1277 |
| | | | | 166/387 |
| 2012/0267123 | A1* | 10/2012 | Gandikota | E21B 43/103 |
| | | | | 166/387 |
| 2015/0000936 | A1 | 1/2015 | Nguy et al. | |
| 2017/0342797 | A1* | 11/2017 | Murphree | E21B 33/1208 |
| 2018/0371866 | A1* | 12/2018 | Shimada | E21B 41/0085 |
| 2019/0048680 | A1* | 2/2019 | Stein | E21B 33/1208 |

FOREIGN PATENT DOCUMENTS

| | | |
|---|---|---|
| JP | H1113378 A | 1/1999 |
| JP | 2000045260 A | 2/2000 |
| JP | 2008073925 A | 4/2008 |
| JP | 2015105564 A | 6/2015 |
| WO | 2013090257 A1 | 6/2013 |

OTHER PUBLICATIONS

Written Opinion dated Mar. 14, 2017 issued in International Application No. PCT/JP2016/086702.

* cited by examiner

PACKER

TECHNICAL FIELD

The present invention relates to a packer that seals a gap (annulus part) formed between a wall of a well and a casing pipe inserted into the well in drilling of the well.

BACKGROUND ART

For example, a resin packer as described in JP 2015-105564 A has conventionally been used as a packer that seals an annulus part in drilling of a well.

The resin packer is connected, for use, to a casing pipe which is inserted into a well. The packer expands by a predetermined mechanism at a predetermined position inside the well to seal an annulus part which is located at the predetermined position so as to separate a predetermined section thereof. Accordingly, it is possible to selectively collect oil or gas from the section.

It is expected that such a well drilling technique using a packer be applied also to geothermal power generation. In geothermal power generation, it is assumed that a section of any annulus part inside a drilled well is sealed, and water injection and hydraulic fracturing are performed with respect to the section to obtain a high-temperature fluid.

The high-temperature fluid is taken into the inside of the casing pipe and collected. Accordingly, a thermal energy of the high-temperature fluid can be used for power generation. A resin packer can be used at a location having a formation temperature of approximately 200° C.

However, in supercritical geothermal power generation which has been actively studied in recent years, it is assumed that a packer is used in a formation having an ultra-high temperature of 400° C. to 500° C. A resin packer cannot be used under such a temperature environment.

Thus, as described in JP 11-13378 A, it is conceivable that a packer is made of not resin, but metal.

The metal packer of JP 11-13378 A includes a metal container and expansive concrete sealed inside the metal container. When the metal packer reaches a predetermined formation, water flowing out of the formation and the expansive concrete come into contact with each other. Accordingly, the expansive concrete inside the metal container expands, which expands the metal container. Thus, it is possible to close a borehole.

SUMMARY OF INVENTION

Technical Problem

However, in the metal packer described in JP 11-13378 A, although a metal member is capable of resisting the ultra-high temperature of 400° C. to 500° C., the expansive concrete is incapable of resisting the temperature of this range. Thus, the metal packer described in JP 11-13378 A also cannot be used under the ultra-high temperature environment.

Further, the expansive concrete used in the metal packer described in JP 11-13378 A is an expensive material. Thus, a packer of such a mode increases the manufacturing cost.

Thus, the present invention has been devised in view of the above problems, and an object thereof is to provide a packer that can be manufactured at a low cost and used in a formation having an ultra-high temperature of 400° C. to 500° C.

Solution to Problem

A packer according to a first invention is a packer connected to a casing pipe, the packer including: a connecting tube made of metal and connected to the casing pipe; and a packer part made of metal and attached around the connecting tube, wherein the packer part has a hollow part inside thereof, a sealed liquid that thermally expands is sealed in the hollow part, and an outer peripheral wall of the packer part includes an expansive part that protrudingly deforms outward with the thermal expansion of the sealed liquid.

In the packer according to a second invention, in the first invention, the expansive part is formed in a bellows shape in a part of the outer peripheral wall of the packer.

In the packer according to a third invention, in the first invention or the second invention, the sealed liquid is water.

In the packer according to a fourth invention, in any one of the first invention to the third invention, the outer peripheral wall of the packer includes a cleavage part that cleaves when a pressure of the sealed liquid becomes a predetermined pressure or more to release the sealed liquid to the outside.

In the packer according to a fifth invention, in the fourth invention, the cleavage part is a thin-walled part.

In the packer according to a sixth invention, in the fourth invention, the cleavage part is a rupture disk.

Advantageous Effects of Invention

According to the present invention having the above configurations, it is possible to provide a packer that can be manufactured at a low cost and used in a formation having an ultra-high temperature of 400° C. to 500° C.

DESCRIPTION OF EMBODIMENTS

Figure 1:
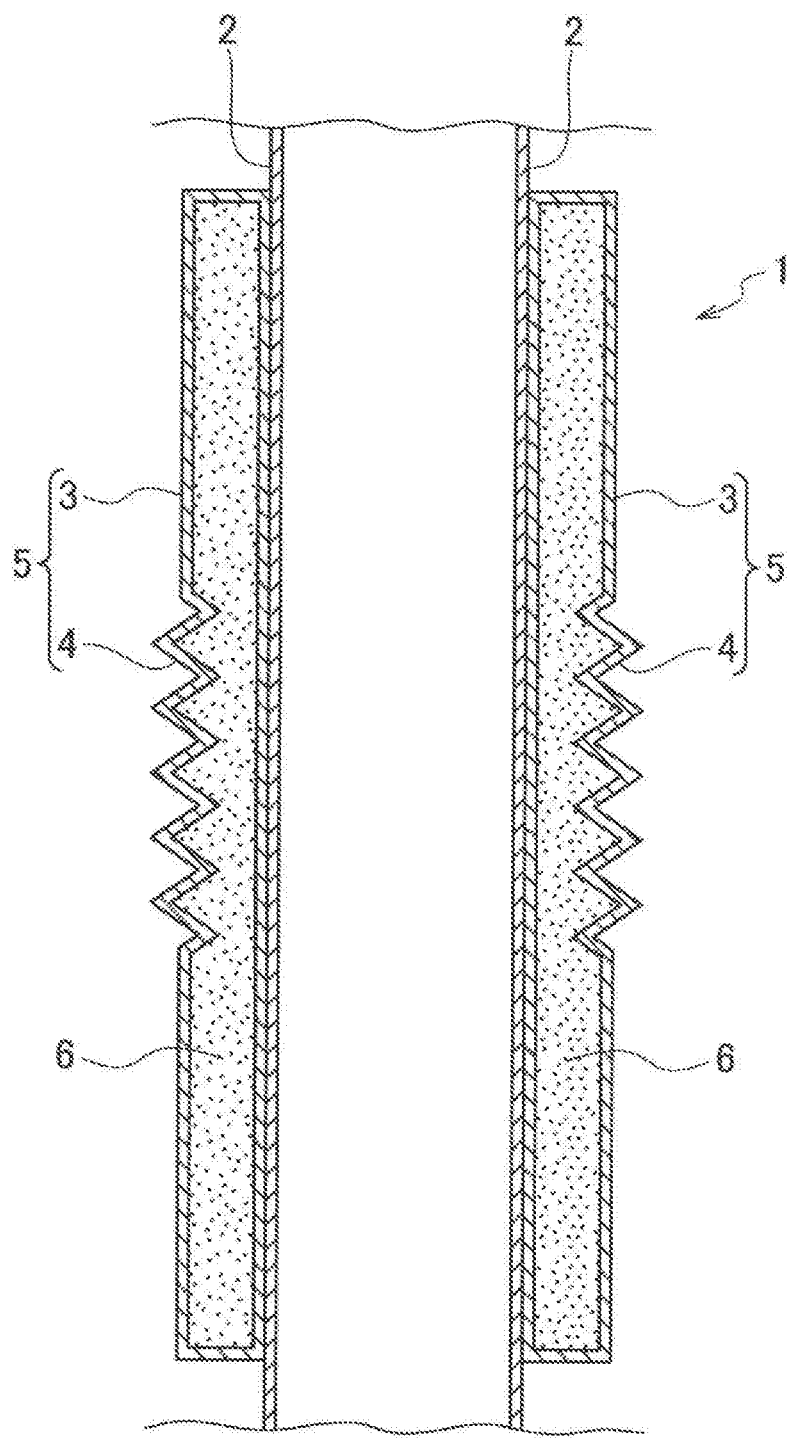
FIG. 1 is a sectional view of a packer according to an embodiment of the present invention.
Figure 2:
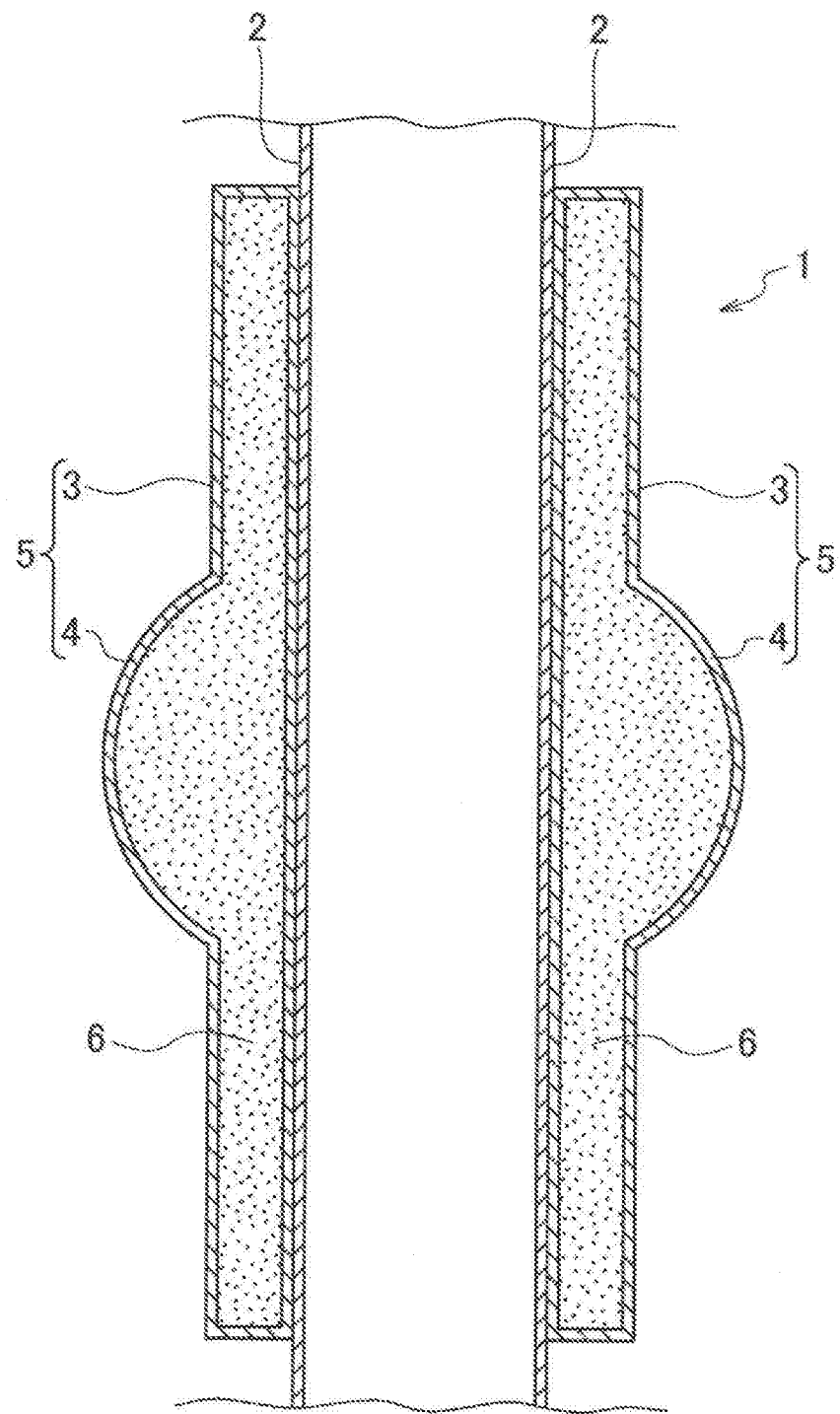
FIG. 2 is a sectional view illustrating a state in which an expansive part of the packer according to the embodiment of the present invention protrudingly deforms outward with thermal expansion of a sealed liquid.

Hereinbelow, a packer according to an embodiment of the present invention will be described in detail. FIG. 1 is a sectional view of a packer 1 according to the embodiment of the present invention. FIG. 2 is a sectional view illustrating a state in which an expansive part 4 of the packer 1 of FIG. 1 protrudingly deforms outward with thermal expansion of a sealed liquid.

The packer 1 according to the present embodiment is a substantially cylindrical metal member which is connected to a casing pipe to be inserted into a well and not thermally deteriorated by temperature of 400° C. to 500° C.

Specifically, the metal member which is not thermally deteriorated by the temperature of 400° C. to 500° C. is preferably stainless steel such as SUS304 which is inexpensive and excellent in oxidation resistance and corrosion resistance at a high temperature. When importance is attached to durability at an ultra-high temperature, INCONEL (registered trademark) 600 manufacture by Special Metals Corporation is more preferred. INCONEL 600 has high corrosion resistance at a high temperature and has oxidation resistance up to 1180° C. A chemical composition of INCONEL 600 (registered trademark) includes, in percentage by weight, 72.0% or more of nickel (+cobalt) (Ni (+Co)), 14.0% to 17.0% of chromium (Cr), 6.0% to 10.0% of iron (Fe), 1.0% or less of manganese (Mn), 0.015% or less of sulfur (S), 0.5% or less of silicon (Si), and 0.5% or less of copper (Cu).

The packer 1 includes a connecting tube 2 which is connected to the casing pipe and a packer part 5 which is attached around the connecting tube 2.

The connecting tube 2 is a tubular member which is connected, for use, to the casing pipe by any connecting means and has substantially the same diameter and thickness of a peripheral wall as the casing pipe.

The packer part 5 is a substantially cylindrical member and attached along the peripheral wall of the connecting tube 2. The packer part 5 is hollow. The expansive part 4 and a general part 3 are formed on the outermost peripheral wall (outer peripheral wall).

The expansive part 4 is formed by folding a thin metal plate, which is a material of the packer 1, into a bellows shape in a circumferential direction in a substantially central part in a tube axial direction of the packer 1. The length in an up-down direction and the shape of the expansive part 4 can be set to any length and any shape according to a used location of the packer 1.

The general part 3 is a cylindrical part which is formed around the expansive part 4 and the connecting tube 2 as the casing pipe, and has a linear shape on a vertical cross section. The length of the general part 3 can be set to any length.

A sealed liquid 6 which thermally expands is sealed inside the packer 1. In the present embodiment, water is assumed as the sealed liquid 6. However, in the present invention, the sealed liquid 6 is not limited to water. Any thermally expandable liquid that does not cause corrosion of the outer peripheral wall of the packer 1 can be suitably used.

Figure 4:
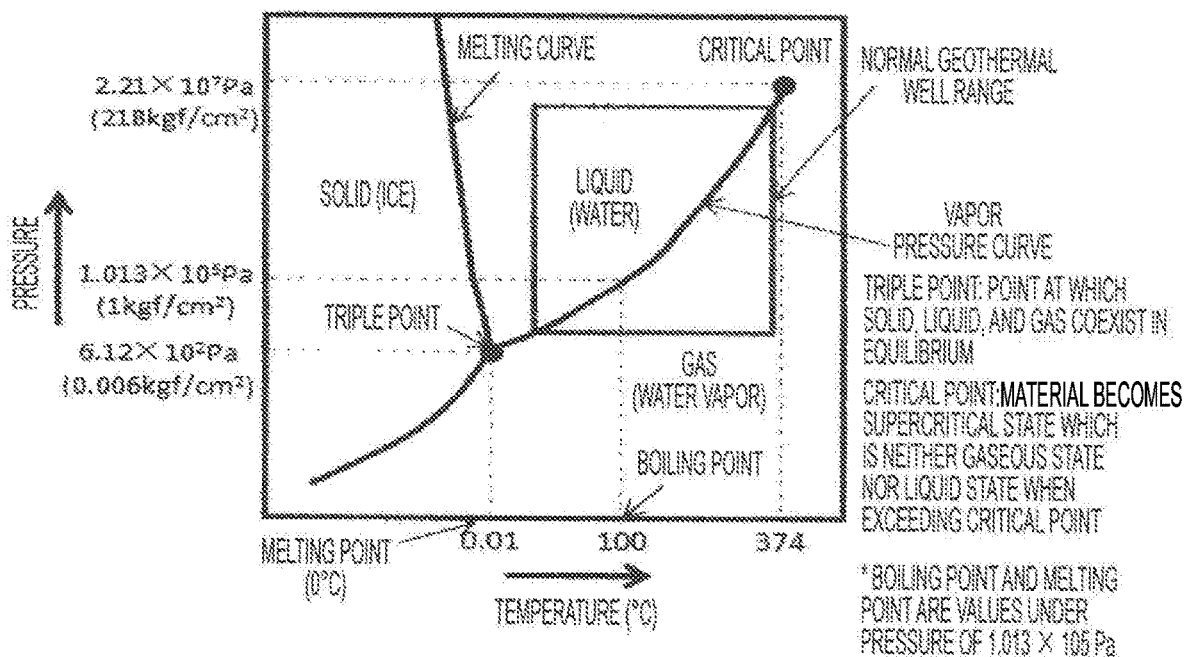
FIG. 4 is a graph of a state change illustrating a relationship between temperature and pressure of water.

Here, water which is inexpensive is preferred as the sealed liquid 6. FIG. 4 is a graph of a state change illustrating a relationship between temperature and pressure of water. As illustrated in FIG. 4, water changes into three states of solid (ice), liquid (water), and gas (water vapor) according to the temperature and the pressure. When the temperature becomes 374° C. or more and the pressure becomes $2.21 \times 10^7$ Pa or more on a vapor pressure curve, liquid water and gaseous water are undistinguishable from each other. Such a point is called a critical point, and the temperature and the pressure at the critical point are called a critical temperature and a critical pressure, respectively. It is known that water beyond the critical point has a function as a special medium. The form of water under a supercritical condition is supercritical water which is neither gas nor liquid.

A pressure (burst pressure) that breaks the packer part 5 is lower than a crushing pressure of the casing pipe and the connecting tube 2. Accordingly, it is possible to prevent the casing pipe and the connecting tube 2 from being damaged by an action of the packer part 5.

Next, a sealing mechanism for an annulus part by the packer 1 as described above will be described. FIG. 2 is a sectional view illustrating a state in which the expansive part 4 of the packer 1 according to the embodiment of the present invention protrudingly deforms outward with thermal expansion of the sealed liquid 6.

The packer 1 connected to the casing pipe makes a descent into a well along with the insertion of the casing pipe into the well. At this time, since the packer 1, which is a thermally expansive packer, is a mechanism which enlarges with a rise in a formation temperature, a cooling mechanism which prevents the expansion until the packer 1 is installed at a high-temperature location is required. Thus, the packer 1 makes a descent while being cooled by a cooling mechanism (not illustrated). It is assumed that the cooling mechanism includes a tank which stores a coolant therein, a circulation pump, and a hose which is connected to the pump and inserted into the connecting tube 2 to which the packer is attached. The packer 1 is cooled by circulating the coolant from the ground.

Then, when the packer 1 reaches a formation having an ultra-high temperature of 400° C. to 500° C., the cooling of the packer 1 is stopped, so that the sealed liquid 6 sealed inside the packer 1 thermally expands.

The expansive part 4 having a bellows shape protrudingly deforms (expands) outward with the thermal expansion of the sealed liquid 6. Accordingly, the expansive part 4 abuts against an inner wall of the well and presses the inner wall. The annulus part can be sealed by the abutment of the expansive part 4 deformed in this manner against the inner wall of the well.

The packer 1 is made of metal that is not thermally deteriorated by the temperature of 400° C. to 500° C. Thus, the packer 1 can achieve a sealing effect for the annulus part even under an ultra-high temperature environment. As described above, the form of water under the supercritical condition is supercritical water which is neither gas nor liquid. The expansion pressure of water of the packer 1 is obtained by calculation of a specific volume by the temperature and the pressure of pure water.

The size and the shape in the tube axial direction and the circumferential direction of the expansive part 4 and the length in the tube axial direction of the general part 3 can be appropriately adjusted according to, for example, the diameter of the inner wall of the well in which the packer 1 is used, a required sealing degree, and an operating temperature.

For example, the bellows of the expansive part 4 is formed in a fine bellows, so that the shape of the expansive part 4 can be brought into a shape closer to a circular shape when expanded.

Further, any shape, other than a bellows shape, that is deformable by the thermal expansion of the sealed liquid 6 can be appropriately employed as the shape of the expansive part 4.

Further, as the length in the tube axial direction of the general part 3 becomes longer, an amount of the sealed liquid 6 that can be sealed inside the packer 1 can be increased. Thus, it is possible to increase a degree of expansion of the expansive part 4 by the thermal expansion of the sealed liquid 6.

As described above, the expansive mechanism of the packer 1 is implemented by the thermal expansion of the sealed liquid 6 which is sealed inside the packer 1 without providing a mechanical mechanism such as a pump. Accordingly, the expansive mechanism reliably operates even under the ultra-high temperature environment to enable sealing of the annulus part.

Figure 3:
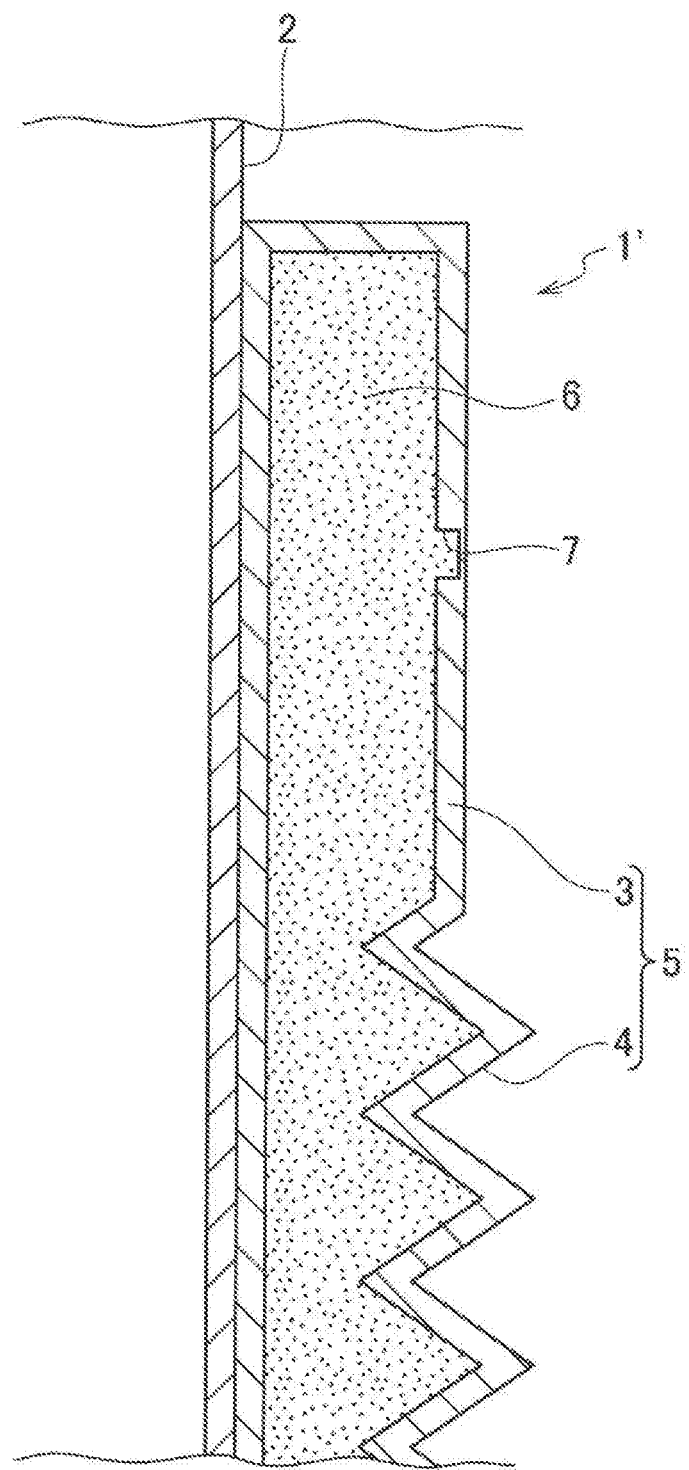
FIG. 3 is a partially enlarged sectional view of a packer according to a modification of the present invention.

Next, a modification of the present invention will be described. FIG. 3 is a partially enlarged sectional view illustrating a state in which a packer 1' according to the modification of the present invention is attached to a casing pipe.

The packer 1' according to the modification is similar to the packer 1 according to the embodiment described above except that a cleavage part 7 is formed on the general part 3 of the packer part 5. Thus, hereinbelow, the cleavage part 7 will be described in detail. The same configuration as the above embodiment is denoted by the same reference sign as the above embodiment.

The cleavage part 7 is formed by making a part of the general part 3 thin. The cleavage part 7 is a mechanism which ruptures when the expansion pressure of the sealed liquid 6 inside which thermally expands becomes a predetermined value or more to release the sealed liquid 6 inside to the outside, of the packer 1'.

The predetermined pressure that ruptures the cleavage part 7 is set higher than the enlargement pressure of the packer 1' and lower than the burst pressure of a body of the packer 1' and the crushing pressure of the connecting tube 2 as the casing pipe.

The cleavage part 7 provided as described above makes it possible to release the sealed liquid 6 to the outside by the rupture of the cleavage part 7 before the expansion pressure of the sealed liquid 6 inside the packer 1' increases and breaks the packer 1' to reduce the expansion pressure. Thus, it is possible to effectively prevent damage of the packer 1' caused by a rise in the expansion pressure of the sealed liquid 6.

Further, since the expansive part 4 is made of metal, the expansive part 4 can maintain an expanded and deformed state also after the sealed liquid 6 is released to the outside by the rupture of the cleavage part 7. Thus, a sealed state of the annulus part can be maintained.

In the present modification, the cleavage part 7 is formed by making a part of the general part 3 thin. However, the present invention is not limited to this mode, and may be, for example, a mode in which the cleavage part 7 is formed of a rupture disk.

REFERENCE SIGN LIST

1, 1' packer
2 connecting tube (casing pipe)
3 general part
4 expansive part
5 packer part
6 sealed liquid
7 cleavage part

The invention claimed is:

1. A packer connected to a casing pipe to seal a gap formed between a wall of a well and the casing pipe inserted into the well in drilling of the well, the packer comprising:
   a connecting tube made of metal and connected to the casing pipe; and
   a packer part made of metal and attached around an outer periphery of the connecting tube, the packer part expanding to abut against the wall of the well, press the wall, and seal the gap from the wall of the well,
   wherein:
   the packer part has a hollow part inside thereof,
   a sealed liquid that thermally expands is sealed in the hollow part,
   an outer peripheral wall of the packer part includes an expansive part that protrudingly deforms outward with the thermal expansion of the sealed liquid,
   the outer peripheral wall of the packer part is made from a thin metal plate, and
   the expansive part has a bellows shape formed by folding a part of the outer peripheral wall.

2. The packer according to claim 1, wherein the sealed liquid comprises water.

3. The packer according to claim 2, wherein the outer peripheral wall of the packer part includes a cleavage part that cleaves when a pressure of the sealed liquid becomes at least a predetermined pressure to release the sealed liquid to outside of the packer part.

4. The packer according to claim 3, wherein the cleavage part comprises a thin-walled part.

5. The packer according to claim 1, wherein the outer peripheral wall of the packer part includes a cleavage part that cleaves when a pressure of the sealed liquid becomes at least a predetermined pressure to release the sealed liquid to outside of the packer part.

6. The packer according to claim 5, wherein the cleavage part comprises a thin-walled part.

7. A packer connected to a casing pipe, the packer comprising:
   a connecting tube made of metal and connected to the casing pipe; and
   a packer part made of metal and attached around the connecting tube,
   wherein:
   the packer part has a hollow part inside thereof,
   a sealed liquid that thermally expands is sealed in the hollow part, and
   an outer peripheral wall of the packer part includes (i) an expansive part that protrudingly deforms outward with the thermal expansion of the sealed liquid, and (ii) a rupture disk that ruptures when a pressure of the sealed liquid becomes at least a predetermined pressure to release the sealed liquid to outside of the packer part.

8. The packer according to claim 7, wherein the outer peripheral wall of the packer part is made from a thin metal plate, and the expansive part has a bellows shape formed by folding a part of the outer peripheral wall.

9. The packer according to claim 8, wherein the sealed liquid comprises water.

10. The packer according to claim 7, wherein the sealed liquid comprises water.

* * * * *